UNITED STATES PATENT OFFICE.

SCOTT H. HULL, OF CINCINNATI, OHIO.

GLAZE, ENAMEL, OR GLASS COMPOSITION.

1,158,922.  Specification of Letters Patent.  Patented Nov. 2, 1915.

No Drawing.  Application filed March 20, 1914. Serial No. 825,994.

*To all whom it may concern:*

Be it known that I, SCOTT H. HULL, a citizen of the United States, and a resident of Cincinnati, in the county of Hamilton and State of Ohio, have discovered and invented certain new and useful Improvements in Glaze, Enamel, or Glass Compositions, of which the following is a specification.

My discovery and invention relates to glazing, enameling or glass manufacture, and has for its object the provision of the desired metallic constituent in glaze, enamel or glass in an effective, economical and safe manner.

My discovery and invention consists in providing the metal constituent in its uncombined form.

My discovery and invention is more particularly applicable to glazing of pottery ware, tile and earthenware, in which a salt or other product of corrosion of or chemical action upon metal is used.

Glazes, enamels and glass have long been made with the addition of some salt of a metal or other product of corrosion of or chemical action upon the metal, such as oxid of lead, carbonate of lead or white lead, or oxid of zinc, the function of these ingredients generally being to impart to the glaze, enamel or glass composition increased fusibility, or to impart to the finished product thereof increased strength, density, softness or luster. I have discovered that the metal itself may be incorporated in the glaze, enamel or glass, and that the metal itself will produce the effect which the carbonate or oxid or other product of corrosion of or chemical action upon the metal will produce. While the metal constituent thus provided in its metallic form is a suitable substitute for the substances heretofore used, it affords a considerable saving, because the metal generally costs no more for a given weight than does the metal in combined form, since, as it seems, the metal, aside from the other elements combined with it in the combined form, is the active element; and the other elements are either driven off during the firing or heating or combined in the glaze without having any utility. Thus, taking carbonate of lead or white lead as an example, which is largely used as a constituent of glaze, enamel or glass, it seems that the carbon and oxygen combined with the lead has no utility and performs no function in the glaze; but as is well known in the art, carbonate of lead or white lead costs substantially the same as the metallic lead, and commands substantially the same or a slightly higher price on the market; so that the potter or manufacturer in buying this ingredient, is obliged to pay for a certain weight of carbon and oxygen, or other extra substance, in the carbonate of lead, in order to obtain the effect of the amount of lead element in the ingredient, whereas, by using the lead in its metallic form, practically no other substance is bought, and practically all of the ingredient is useful in the glaze. Experience in connection with my discovery and invention has shown that this circumstance admits of the reduction of weight of this constituent from 25 to 50 per cent., and the results attained are fully equal to those that have been obtained with the use of the white lead or other combined form of or product of corrosion of or chemical action upon the particular metal desired to be used in the glaze, enamel or glass.

Where carbonates or oxids or other combined forms of products of corrosion of or chemical action upon the materials have been used, they have been obtained in finely pulverized condition so that they are readily suspended in the liquid mixture of the glaze, and thus uniformly distributed throughout the glaze on the ware as the ware is dipped into the glazing-mixture, or as the mixture is applied to the ware with a brush or otherwise. In utilizing the metal itself I provide it in finely pulverized form, preferably in a substantially impalpable powder, and find that it is capable of suspension in the mixture substantially as uniformly as the ingredient in combined form would be; and that, when the proper proportion of the metal is used, the finished product will be found uniform in appearance and without any appearance of the metal. In providing the finely pulverized metal, especially with respect to lead, it is preferably obtained as a result of a process of comminuting or granulating lead to be corroded in the manufacture of carbonate of lead or white lead. The greater proportion of white lead is used in the making of paint and similar products, while a less but important proportion has been used for the metallic constituent of glazes, enamels or glass. For the purposes of corrosion, the lead need not be so finely divided, and a comminuting process which has been found thoroughly practicable for corroding purposes consists in the ejection of molten lead in a small jet into a chamber where it is suddenly condensed and falls in the form of a rather fine powder or small granules. At the same time this moderately fine powder is produced there is a much finer powder of the lead, which is deposited along with the coarser particles; and by introducing a fine screen, which allows the fine powder to pass through but retains the coarser powder or granules, I am enabled to obtain the substantially impalpable powder of the metal, above referred to, leaving the coarser powder or granules for use in the manufacture of white lead and applying the substantially impalpable powder to the making of glazing mixture as mentioned.

The above method is preferable for obtaining the fine lead powder rather than by attempting to grind the metal, because lead is of such a softness and malleability that it is difficult to grind it. Harder or more brittle metals, such as zinc for example, may be found to be susceptible to crushing or grinding into a powder of sufficient fineness.

When any of the metals are obtained in finely powdered form, they may be mixed with the other ingredients for the glazing mixture, either by tumbling or grinding them therewith in dry form, or by addition to the fluid mixture or paste, according to the method preferred by the user. Also the other ingredients of the glaze may be any such as are well known, or such as are preferred by the glazer or potter, whether the particular ingredients preferred are well known or are those making up any of the secret compositions in use by different glazer, enamelers, potters, or glass manufacturers.

Another highly important advantage of the use of my discovery and invention is the elimination of the danger of poisoning of the operatives by the material used. This is especially important in connection with the use of substances containing lead. Thus, for example, carbonate of lead, in finely powdered form, while highly suitable for suspension in the glaze mixture, is also capable of ready suspension in the atmosphere, and will diffuse throughout the plant, to be breathed by the persons therein with the most distressing results on account of the poisonous nature of the substance. The metal itself, on account of its specific gravity, is not taken up by the atmosphere, but, at the same time, when in a finely divided state, the metal is found to be freely suspended and uniformly distributed throughout the mixture, so that the desired effects are obtained without the deleterious effects which the lighter combined forms have, as above referred to. The annoying and damaging permeation of these substances, such as white lead, is almost unpreventable; and while laws are being provided prohibiting potters and other manufacturers from allowing the circulation of such substances in the atmosphere of their plants, any practicable means of avoiding it is difficult to provide, and involves considerable expense. My discovery and invention, therefore, while saving the manufacturer from 25 to 50 per cent. of the expense connected with the provision of a metallic ingredient in the mixture, also safeguards the health of the operatives and effects an additional saving to to the manufacturer; because practically no preventive means need be provided where the metal ingredient in its metallic form is used according to my discovery and invention.

While the substitution of metallic lead for carbonate of lead and the substitution of metallic zinc for oxid of zinc are more particularly referred to herein; and while the provision of the metal in a substantially impalpable powder is preferred; and the production of this powder in connection with the pulverization or granulation of lead by a condensation of a small jet of the molten metal is the most practical method of producing the powder; it will be understood that the scope of my discovery and invention extends to the utilization of a metal instead of some combined form of product of corrosion of or chemical action upon the metal with any of the above objects in view, and with the attainment of any of the aforesaid advantages, either of economy, facility of operation or increased safety to the operatives. In the manufacture of certain kinds of glass and glassware, a metallic constituent is desirable in the material, and in this industry, also, combined forms of metal have been used, and especially is carbonate of lead or white lead used to provide a lead constituent in the glass. It will be seen that the same benefits are derived in glass manufacture from my discovery and invention as are described above as being derived from it in glazing or pottery ware, stoneware, china, porcelain, glassware, tile, earthenware, plumbing fittings and numerous other wares produced by similar methods. The same advantages are also attained in the making of enamels, whether for any kind of pottery ware or for metal ware, such as kitchen utensils, reservoirs, bath tubs, or other plumbing fittings, or any other metallic ware or other ware made of material which will permit of the fusing either of glaze or enamel thereon.

While the pure metal will be found highly desirable, it will be understood that the metal need not be chemically pure; and that such impurities as are usually found in the ordinary commercial grades of lead, zinc or other metals either such as were not eliminated in smelting, or such as they acquire in storage, as from slightly oxidizing in contact with air, will not prohibit the use of these metals; and that the use of the metal itself in any degree of purity in a material for glazing, enameling or making glass is within the scope of my discovery and invention.

In any of the above applications of my discovery and invention, it will be understood that the economy effected may permit the substitution of a metal itself where a salt or other chemical compound of another metal had been used.

Having fully described my invention, what I claim as new and desire to secure by Letters Patent is:

1. A glaze, enamel or glass composition containing as an ingredient a metal in its metallic state and in the form of a substantially impalpable powder produced by condensation of the metal in a finely divided state.

2. A glaze, enamel or glass composition containing as an ingredient a metal itself substituted for the salt, product of corrosion, or chemical compound of a metal.

3. A glaze, enamel or glass composition containing as an ingredient metallic lead substituted for a salt, product of corrosion, or chemical compound of lead.

4. A glaze, enamel or glass composition containing as an ingredient metallic lead itself, substituted for carbonate of lead or white lead.

5. A glaze, enamel or glass composition containing as an ingredient metallic lead itself, substituted for carbonate of lead or white lead, said metallic lead being in the form of a powder, substantially as impalpable as carbonate of lead or white lead in the form in which it is generally used for such an ingredient.

6. A glaze, enamel or glass composition containing as an ingredient lead in its metallic state.

7. A glaze, enamel or glass composition containing as an ingredient lead in its metallic state and in the form of powder.

8. A glaze, enamel or glass composition containing as an ingredient metal in its metallic state having the function of imparting increased fusibility to the composition or of imparting increased strength, density, softness or luster to the finished product thereof.

9. A glaze, enamel or glass composition, containing as an ingredient a metal in its metallic state incorporated in the composition previous to melting said composition.

10. A glaze, enamel or glass composition, containing as an ingredient a metal in its metallic state incorporated in the composition previous to melting said composition, said metal being in a form in which when said composition is brought into a liquid state, said metal is suspended in the liquid composition and uniformly distributed therethrough ready for diffusion throughout the composition and throughout the finished product thereof upon the application of heat to said composition.

11. A glaze, enamel or glass composition containing as an ingredient a metal in its metallic state and in the form of powder, having the function of imparting increased fusibility to the composition or of imparting increased strength, density, softness or luster to the finished product thereof.

12. A glaze, enamel or glass composition containing as an ingredient a metal in its metallic state incorporated in the composition while the composition is in a liquid state previous to melting, said metal being in a form in which it is suspended in the liquid composition and uniformly distributed therethrough ready for diffusion throughout the composition and throughout the finished product thereof upon the application of heat to said composition.

SCOTT H. HULL.

Witnesses:
JAMES N. RAMSEY,
CLARENCE PERDEW.